Figure 1:
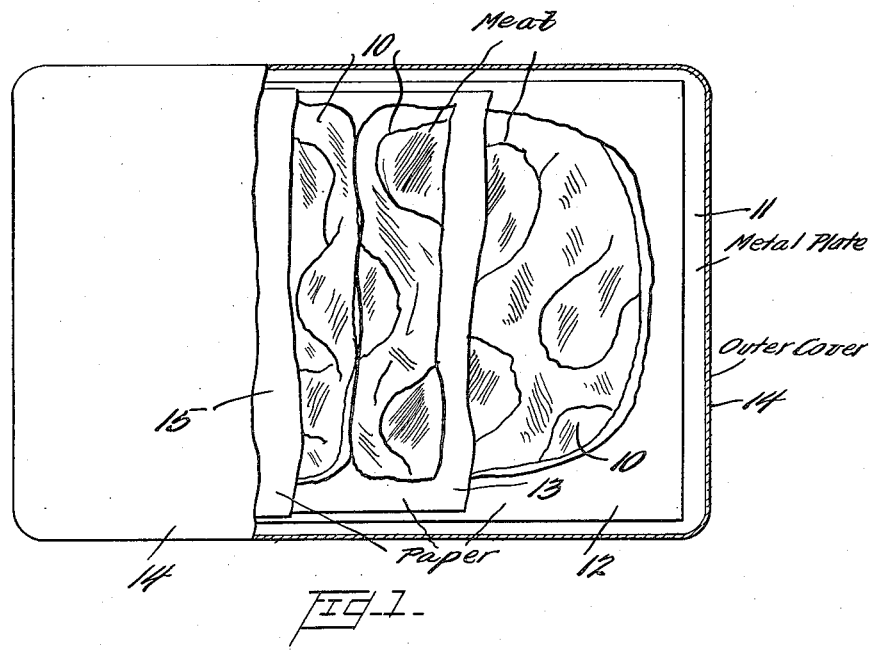

Inventor
Justus G. Saunders
By Frank W. Dohner
Attorney

Patented Dec. 5, 1950

2,533,051

UNITED STATES PATENT OFFICE 2,533,051

MEAT PACKAGE AND METHOD OF MAKING THE SAME

Justus G. Saunders, Silver Spring, Md.

Application August 16, 1950, Serial No. 179,814

16 Claims. (Cl. 99—174)

My said invention relates to an improved method of handling and packaging meat, and an improved meat package for self-service display cases. The principal object of the invention is to provide a rigid foundation for a fresh cut of meat, which foundation shall be free from any danger of corrosion or change of color by contact with the meat; which shall be impervious to liquids, so that it will not attract or absorb any of the juices of the meat; which shall be well adapted to hold the parts of a cut of meat in place for relatively long periods of time; which shall reduce the space required for display of meat in self-service meat retail establishments for the reason that packages made up with the use of the novel foundation can be stacked directly upon one another in a self-service display showcase without detriment or loss of shape; and which shall effect savings in cost of operation for such self-service stores by reason of the fact that less servicing is required, particularly for self-service stores, than is now the case.

Another object of the invention is to provide a foundation for meat cuts by the use of which cuts of meat shall present a better appearance for longer periods than is true with present methods of meat wrapping, displaying and handling, and shall have this advantage whether the meat cuts are merely located on the foundation without wrapping, or are wrapped in sealed or unsealed packages.

Actual comparative tests of meat packaged respectively by my method and by conventional methods, such cuts being left on display for as long as forty hours, show a very great difference in appearance and attractiveness, the cuts handled by my method showing very little or no deterioration whereas the other cuts were practically unsaleable. The packaged cuts retained their bloom and appetizing appearance, and also retained all their juices as well.

Another object is to provide an improved sanitary method for the handling of meat.

Another object is to provide a method of meat handling whereby cuts of meat of any character and shape can be handled and transported without loss of shape and shall retain their appearance and bloom more fully and for longer periods than when handled by conventional methods.

Another object of the invention is to provide means and a method whereby meat cuts such as steaks, cutlets, chops, flat surfaced roasts and the like can be packaged in such manner that they can be packed along with other purchases by the shopper and yet will arrive in the hands of the cook or housewife in perfect condition, without such loss of shape or appearance as is commonly the case at present.

It is an important object of my invention to reduce the retail cost of meat by eliminating many of the costs of handling. Thus, it is feasible to supply the meat department of each of a number of retail outlets from a centralized meat cutting plant, where a number of cutters may work under close and strict supervision, instead of having carcasses cut up at each retail outlet by one or more men, each of whom may have some ideas of his own as to proper procedure. By having meat for all the retail outlets cut up at a centralized plant, uniformity of cuts can be insured, quality is controlled, a large saving can be had in labor cost, methods of cutting, trimming and packaging can be standardized, as well as methods of weighing and labeling, the cost of equipment can be reduced by eliminating duplication of meat saws, scales and the like at each store, consolidated refrigeration facilities will reduce the cost of cooling and preserving the meat, and losses due to trimming and spoilage are controlled.

Figure 2:
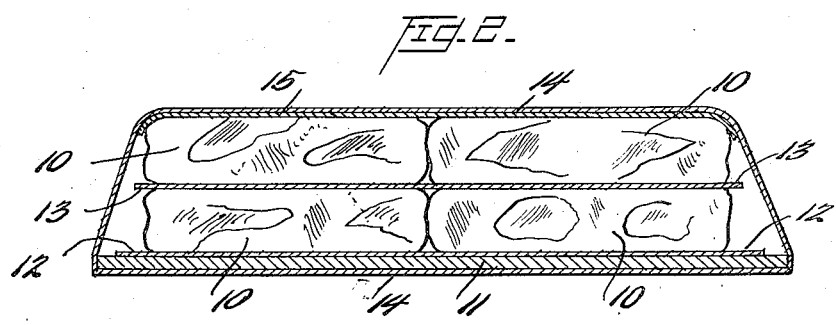

Referring to the annexed drawings, which are made a part of this application and in which similar reference characters indicate similar parts:

Fig. 1 is a plan of a meat package made according to my invention, the wrappings being partly broken away to show the cuts of meat, which elsewhere are indicated by dotted lines, and Fig. 2, a vertically longitudinal section of the package, on an enlarged scale.

In the drawings, reference character 10 indicates cuts of meat in the form of pork chops or mutton chops arranged in two layers each comprising two such chops. Such cuts whether prepared for roasting, broiling or other culinary process, are placed on a foundation plate 11, which in the form preferred by me at present may be a thin plate of half hard aluminum, e. g., one-thirty-second of an inch in thickness and which should preferably be of a size to hold several chops or other small cuts. Among the advantages of such a plate are the fact that it does not take on any of the juices of the meat or any other moisture occurring in connection therewith, so that the plate maintains its appearance and shape even though used many times and with pieces of meat of various kinds and conditions. Neither does it take on the odor of meat or of any particular kind or condition of meat, which term is herein used as including fish, sausage, liver or any other variety of meat-like product or composition or having characteristics or behavior similar to that of the flesh of animals, whether land animals, sea life or bird life. Neither does it discolor the meat or transmit any odor thereto, or produce any other deleterious effect therein.

Another advantage arising from the use of such a plate is that it is a very good conductor of heat or cold, and so will distribute refrigerating effects over the entire bottom face of a slab in contact therewith even though the plate may have only a corner in contact with a source of refrigeration or against a freezing unit.

Another advantage of such a plate is that the plate, being flat, will effectively seal the pores of the meat and prevent leakage of juices, while also holding the meat firmly in shape, so that it presents a good appearance even after standing for such a length of time as would result in quite substantial loss of attractiveness if unpackaged or if packaged by known methods. It is to be understood that the plates 11 are flat and smooth and may be polished for good appearance and for the best effects, as well as for ease in cleansing and sterilizing.

The use of such plates eliminates the cost of plates of paper or thin wood, which are discarded after one use, and which are objectionable for numerous other reasons, and it reduces costs for wrapping paper and various other costs of handling, etc.

While a plate, as described, may be made preferably of aluminum, other metals may be used, e. g., stainless steel or other metal suited for particular situations, and even such materials as some of the plastics may be used if they have the desired qualities as herein set forth. The foundation for supporting cuts of meat may be of any suitable shape, e. g., it may be a flat plate, a shallow platter, or other shape suitable for wrapping, and it may consist of any material that does not absorb meat juices, including materials impregnated to render them non-absorbent, or lined with non-absorbent metal foil or film, it being essential only that a solid foundation be provided which is impermeable to meat juices.

Foundations other than aluminum or other metal, if made of impregnated material film or metal foil are likely not to be adapted for repeated use, since food containers are required by law to be sterilized after each use, and the substance of such non-metal foundations may not be satisfactorily sterilizable by the use of live steam or chemicals.

In certain situations where especial stress is to be placed upon sanitary conditions a thin sheet 12 of vegetable parchment or paper that has been treated with mineral oil is placed upon the plate 11 underneath the meat, and a similar thin sheet 13 may be placed upon the slab of meat for protection, or to afford an emphatic appearance of sanitation in handling meat.

The package consisting of a plate 11, one or more cuts of meat 10, and upper and lower sheets of vegetable parchment or the like, may be enclosed in an opaque wrapping 14 of waterproof material such as wrapping paper treated with mineral oil, which in turn is secured in wrapped position by any suitable means, e. g., by Scotch tape preferably so placed as to seal the package. Heat-sealing cellophane or other self-sealing material may be used for wrapping and transparent material of suitable character has certain obvious advantages.

Particularly in the case of packages of the smaller cuts of meat, as shown in the drawings, it is often desirable to stack several layers of meat upon a plate, each layer consisting usually of several cuts. In such cases a sheet 13 of vegetable parchment or the like will be placed between each pair of successive layers and a sheet 15 of like material is placed upon the uppermost layer or piece.

The plate 11 is shown as slightly larger than the bottom face of the lower layer of meat, and the sheets 12, 13 and 15 are also shown as slightly larger than the contacting surfaces of the meat, but that is not essential.

It is to be noted that a cut of meat or several cuts arranged in a layer will be pressed into shape on a foundation plate according to my invention so as to be supported throughout by the plate instead of allowing the meat to overlap at any edge. The layer will then be held in place by the wrapping material after wrapping and will preserve a good attractive appearance for a relatively long period.

The use of plates of four or more sizes is contemplated, e. g., a small size for holding four juxtaposed lamb chops, and upon which several layers or tiers of meat can be piled, each layer consisting, e. g., of four chops and all being held in position and shape by the same foundation plate. Another size may be suited to hold four pork chops closely pressed together and in one or more such layers; still another may be of a size to hold a steak or like cut, and the largest of a size to hold a chuck roast or like cut.

My invention is well adapted for use in self-service stores though not limited to such use since it enables such stores to stock packaged meats and preserve them in first-class condition for considerable periods of time; to provide packages that can be handled without injury or loss of attractiveness, that can be packed with other purchases without damage, etc., but the invention is not limited to such use, as will be obvious.

I consider the use of a rigid foundation plate that does not become soaked with blood and juices and does not draw off the juices of the meat, the most important feature of my invention, creating a great saving in wrapping paper, in display space, in replenishing showcases, and in other ways, while conducive to better quality and appearance of the meat.

This application is a continuation-in-part of my application, Serial No. 793,667, filed December 24, 1947, now abandoned.

It will be obvious to those skilled in the art that the package of my invention may be altered in various ways from what is herein disclosed, and therefore I do not limit myself to what is shown in the drawings and described in the specification, but only as indicated in the appended claims.

Having thus fully described my said invention, what I claim is:

1. A meat package comprising a plate of aluminum, a slab of meat supported thereon, and wrapping means for said plate and slab.

2. A meat package comprising a metallic plate, a slab of meat supported thereon, said plate corresponding generally in outline to the conformation of said slab, and wrapping means for the plate and slab.

3. A meat package comprising a plate of highly heat conductive material that is impervious to moisture, a slab of meat on said plate, and transparent wrapping means for said slab and its supporting plate.

4. A meat package as in claim 3, wherein the plate consists of metal.

5. A meat package as in claim 3, wherein the plate consists of aluminum.

6. A meat package as in claim 3, wherein the plate has a smooth, flat upper face and consists of aluminum.

7. A meat package as in claim 3, including a sheet of waterproof paper between the plate and the wrapping means.

8. A meat package as in claim 3, including a sheet of waterproof paper between the plate and the meat and another like sheet between the top of the meat and the wrapping means.

9. A meat package comprising a rigid, moisture-resistant plate, meat arranged thereon in a layer substantially covering the plate, other layers arranged in succession upon the first and being coextensive therewith, sheets of waterproof paper covering the top and bottom of each layer of meat, a wrapping of non-transparent waterproof paper, and means sealing the wrapping.

10. A package as in claim 9, each layer of meat consisting of one or more flat-faced cuts of meat and covering the plate or the layer next below it.

11. A meat package comprising a rigid plate impermeable by meat juices, a slab of cut meat supported with a face flat against the plate and a paper wrapper enclosing said plate and meat.

12. A meat package comprising a rigid aluminum plate, a slab of cut meat supported with its face flat against said plate and a non-absorbent paper wrapper enclosing said plate and meat.

13. A meat package comprising a rigid plate impermeable by meat juices, a slab of cut meat supported with its face flat against said plate, a sheet of impervious paper adhering to the upper face of the cut of meat, and wrapping means enclosing and sealing the package.

14. A meat package comprising a rigid aluminum plate, a slab of cut meat supported with its face flat against said plate, a sheet of impervious paper adhering to the upper face of the meat, and an outer wrapper.

15. A meat package comprising a rigid foundation plate impervious to meat juices, a slab of cut meat supported with its face flat against said plate, an inner wrapper for said cut of meat said wrapper consisting of a paper which is non-absorbent of meat juices and serves to protect the meat against the loss of juices and against discoloration, and an outer wrapper.

16. A meat package comprising a rigid plate impermeable by meat juices, a slab of cut meat supported with a flat face against the plate, and a waterproof wrapper enclosing said plate and meat.

JUSTUS GOEBEL SAUNDERS.

No references cited.